UNITED STATES PATENT OFFICE 2,655,542

AMINOKETONES

John B. Wright and Edward H. Lincoln, Kalamazoo, Mich., assignors to The Upjohn Company, Kalamazoo, Mich., a corporation of Michigan No Drawing. Application April 17, 1952, Serial No. 282,899

14 Claims. (Cl. 260—570.6)

This invention relates to certain aminoketones and is more particularly concerned with β-tertiaryamino-α-aryloxyalkyl aryl ketones, the acid addition salts and quaternary ammonium salts thereof, and to a novel process for the production thereof.

The novel compounds of the present invention are the β-tertiaryamino-α-aryloxyalkyl aryl ketones which may be represented by the following formula:

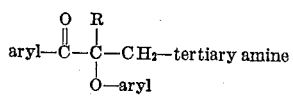

wherein R is hydrogen or a hydrocarbon radical, and acid addition salts thereof. Aryl, wherever mentioned in this specification and the appended claims, is a univalent aromatic carbocyclic radical whose free valence belongs to the monocyclic nucleus. The novel products of the present invention are more particularly those novel compounds represented by the above formula wherein the aryl radicals are selected from the group consisting of phenyl, lower-alkylphenyl, lower-alkoxyphenyl, benzyloxyphenyl, halophenyl, and hydroxyphenyl radicals, and wherein the tertiary amine radical is selected from the group consisting of di-lower-alkylamine, N-(lower-alkyl)benzylamine, dibenzylamine, pyrrolidine, piperidine, and morpholine radicals, and acid addition salts and quaternary ammonium salts thereof.

It is an object of the present invention to provide novel β-tertiaryamino-α-aryloxyalkyl aryl ketones, acid addition salts and quaternary ammonium salts thereof. Another object is the provision of a novel process for the production thereof. Other objects will be apparent to those skilled in the art to which this invention pertains.

The novel compounds of the present invention are prepared by reacting a secondary amine or the corresponding hydrochloric acid addition salt thereof with formaldehyde or paraformaldehyde and an α-aryloxyalkyl aryl ketone. In all cases the reaction proceeded readily and afforded an excellent method of obtaining these novel compounds in high yields. The novel compounds of the present invention possess valuable physiological properties including local anesthetic and bronchodilator activity.

The starting compounds of the present invention are α-aryloxyalkyl aryl ketones. They can be prepared by reacting an α-bromoalkyl aryl ketone with an arylhydroxy compound in the presence of sodium hydroxide [Möhlau, Berichte, 15, 2498 (1882)]. The aryl groups of the starting compounds and products may possess, at various positions on the carbocyclic nucleus, one or a plurality of substituents such as, for example, lower-alkyl and lower-alkoxy wherein the alkyl groups are methyl, ethyl, propyl, isopropyl, butyl, hexyl, heptyl, octyl, etc., benzyloxy, phenoxy, chlorine, bromine, iodine, or the like.

In carrying out the process of the present invention, an α-aryloxyalkyl aryl ketone is mixed with a secondary amine or the corresponding hydrochloric acid addition salt thereof and an aqueous solution of formaldehyde. Secondary amines within the purview of this invention are, for example, alkyl amines, arylalkyl amines, cycloalkyl amines, heterocyclic amines, and pyrrolidines, piperidines, and morpholines, including pyrrolidines, piperidines and morpholines possessing one or a plurality of lower-alkyl groups at various positions of the cyclic nucleus. The reaction may also be carried out in a solvent such as, for example, methanol or ethanol. Alternatively, the aqueous solution of formaldehyde may be replaced with paraformaldehyde, in which case an organic solvent is usually employed such as, for example, an excess of the starting ketone, ethanol, isoamyl alcohol, or the like. In the process of the present invention, formaldehyde and the polymeric forms of formaldehyde may be used interchangeably. The reaction is carried out at a temperature between about room temperature and the boiling point of the reaction mixture, usually between about 65 and about 100 degrees centigrade with the reaction time being somewhat dependent upon the ketone employed and the temperature at which the reaction is carried out, between about one half hour and about 24 hours being the normal reaction time.

The reaction product is usually isolated by the addition of a volume of water, or dilute base when an amine hydrochloride is employed as a reactant, and extracting the whole with, for example, ether, ethyl acetate, benzene, or like water-immiscible solvent. The solvent is then washed with successive portions of dilute base and water and thereafter dried and removed by distillation. Alternatively, the product can be distilled directly from the reaction mixture.

The free amino ketones are usually high boiling liquids although some of the products with high molecular weights are solids. The acid addition salts, especially the hydrochlorides, and the quaternary ammonium salts, are stable, crystalline, generally water soluble and ether, methylene chloride, and benzene insoluble solids.

The following examples are illustrative of the process and products of the present invention but are not to be construed as limiting.

PREPARATION 1.—α-PHENOXY-PARA-N-PROPOXY-ACETOPHENONE

To a stirred solution of 25.95 grams of para-n-propoxyacetophenone in one hundred milliliters of ether was added dropwise 23.3 grams of bromine while maintaining the reaction temperature at ten to fifteen degrees centigrade whereafter a large amount of solid precipitate separated. The ether was then removed at reduced pressure, and a solution of 14.1 grams of phenol and 7.05 grams of sodium hydroxide in seventy milliliters of water was thereafter added to the residue. The mixture was stirred and heated with refluxing for fourteen hours whereafter the cooled reaction mixture was extracted twice with ether. The ether extracts were washed with water, the ether distilled at reduced pressure, and the residue was distilled through a short Vigreaux column to yield 19.1 grams of α-phenoxy-para-n-propoxyacetophenone, boiling at 180 to 190 degrees centigrade at 0.6 milliliter of mercury pressure. The distillate solidified upon standing to yield colorless platelets which melted at 49 to 50.5 degrees centigrade after crystallization from a mixture of cyclohexene and petroleum ether.

*Analysis:*
Percent calculated for $C_{17}H_{18}O_3$ — C, 75.53; H, 6.71
Found — C, 75.57; H, 6.42

PREPARATION 2.—α-(PARA-CHLOROPHENOXY) ACETOPHENONE

A mixture of 39.8 grams (0.2 mole) of phenacyl bromide, 28.3 grams (0.22 mole) of para-chlorophenol, 30.5 grams (0.22 mole) of anhydrous potassium carbonate and 200 milliliters of acetone was refluxed for five hours in a dry atmosphere. Water was then added to the reaction mixture and the whole was thereafter extracted with ether. The ether extracts were washed with dilute sodium hydroxide solution, and then with water, the ether layer was separated and the solvent removed by distillation at reduced pressure. The residue solidified upon standing to yield 44.1 grams of α-(para-chlorophenoxy)acetophenone melting at 96 to 97.5 degrees centigrade. Crystallization of these crystals from 3 A alcohol yielded product melting at 98 to 99 degrees centigrade.

*Analysis:*
Percent calculated for $C_{14}H_{11}ClO_2$ — C, 68.16; H, 4.50; Cl, 14.37
Found — C, 68.25; H, 4.57; Cl, 14.66

PREPARATION 3.—α-(PARA-N-PROPOXYPHENOXY) ACETOPHENONE

A stirred mixture of 19.9 grams (0.10 mole) of phenacyl bromide, 15.2 grams (0.10 mole) of para-n-propoxyphenol, 18.5 grams of anhydrous potassium carbonate and 200 milliliters of acetone was heated at reflux temperature for seven hours. The cooled reaction mixture was thereafter diluted with 200 milliliters of water and the whole extracted several times with ether. The ether extracts were washed with two one-hundred-milliliter portions of a ten percent aqueous sodium hydroxide solution and were thereafter dried with anhydrous sodium sulfate and the solvent removed by distillation. The oily residue was crystallized from a two to one solution of ethyl alcohol and water to yield α-(para-n-propoxyphenoxy)acetophenone which melted at 56.5 to 58 degrees centigrated after crystallization from ethyl alcohol.

*Example 1.—β-Diethylamino-α-phenoxypropiophenone and its hydrochloride*

A mixture of 2.19 grams (0.02 mole) of diethylamine hydrochloride, one drop of concentrated hydrochloric acid, 0.9 gram (0.03 mole) of paraformaldehyde, 4.24 grams (0.02 mole) of α-phenoxyacetophenone [Möhlau, Berichte, 15, 2498 (1882)], and six milliliters of absolute ethanol was heated with refluxing on a steam bath whereupon the mixture soon became homogeneous. Heating was continued for one hour whereafter an additional 0.6 gram (0.02 mole) of paraformaldehyde was added thereto. Heating was resumed for two hours, whereafter another 0.6 gram portion (0.02 mole) of paraformaldehyde was added thereto, and the whole was then heated for an additional two hours. The mixture was maintained at room temperature for sixteen hours and thereafter diluted with thirty milliliters of water and the whole then washed with ether. The aqueous layer was separated, made basic with ammonium hydroxide and thereafter extracted with ether. The ether extracts were dried with anhydrous magnesium sulfate and then distilled at reduced pressure. The residual yellow oil of β-diethylamino-α-phenoxypropiophenone was redissolved in dry ether and about a stoichiometric amount of an ethereal solution of hydrogen chloride was added thereto. The precipitated β-diethylamino-α-phenoxypropiophenone hydrochloride weighed 4.50 grams and melted at 128 to 129 degrees centigrade (corrected). One crystallization of these crystals from an equal mixture of methyl ethyl ketone and ethyl acetate gave colorless square prisms melting at 128.5 to 120 degrees centigrade (corrected).

*Analysis:*
Percent calculated for $C_{19}H_{24}ClNO_2$ — C, 68.35; H, 7.25; N, 4.20; Cl, 10.62
Found — C, 68.31; H, 6.97; N, 4.58; Cl, 10.52

The methyl bromide quaternary ammonium salt of β-diethylamino-α-phenoxypropiophenone is prepared by dissolving the free base in anhydrous ether, cooling the resulting solution contained in a round-bottom flask to zero degrees centigrade, and then adding thereto a large molar excess of methyl bromide cooled to zero degrees centigrade. The tightly stoppered flask is maintained at room temperature for about twelve hours whereafter the precipitated β-diethylamino-α-phenoxypropiophenone methobromide can be isolated by filtration.

*Example 2.—β-dimethylamino-α-phenoxypropiophenone and its hydrochloride*

Following the procedure of Example 1, β-dimethylamino-α-phenoxypropiophenone, melting at 56.5 to 57.5 degrees centigrade, was prepared in 78 percent yield from dimethylamine, paraformaldehyde, hydrochloric acid, and α-phenoxyacetophenone. The thus-produced β-dimethylamino-α-phenoxypropiophenone was converted, with an ethereal solution of hydrogen chloride, to β-dimethylamino-α-phenoxypropiophenone hydrochloride which melted at 153 to 154 degrees centigrade (corrected) after crystallization from methyl ethyl ketone.

*Analysis:*
Percent calculated for $C_{17}H_{20}ClNO_2$ — C, 66.77; H, 6.59; N, 4.58; Cl, 11.59
Found — C, 66.40; H, 6.52; N, 4.49; Cl, 11.39

*Example 3.—β-piperidyl-α-phenoxy-para-n-propoxypropiophenone and its hydrochloride*

Following the procedure of Example 1, β-piperidyl-α-phenoxy-para-n-propoxypropiophenone was prepared in 77 percent yield from piperidine, paraformaldehyde, hydrochloric acid, and α-phenoxy-para-n-propoxyacetophenone. The thus-produced β-piperidyl-α-phenoxy-para-n-propoxypropiophenone was converted with an ethereal solution of hydrogen chloride to β-piperidyl-α-phenoxy-para-n-propoxypropiophenone hydrochloride which melted at 88 to 90 degrees centigrade (corrected) after crystallization from methyl ethyl ketone.

*Analysis:*
Percent calculated for $C_{23}H_{30}ClNO_3$
                           C, 68.38; H, 7.49; N, 3.47
Found                 C, 68.48; H, 7.77; N, 3.38

*Example 4.—β-diethylamino-α-(para-chlorophenoxy)-propiophenone and its hydrochloride*

Following the procedure of Example 1, β-diethylamino-α-(para-chlorophenoxy)-propiophenone was prepared from diethylamine, paraformaldehyde, hydrochloric acid, and α-(para-chlorophenoxy)-acetophenone. The thus-prepared β-diethylamino-α-(para-chlorophenoxy)-propiophenone was converted with an ethereal solution of hydrogen chloride to β-diethylamino-α-(para-chlorophenoxy)-propiophenone hydrochloride which melted at 104.5 to 105.5 degrees centigrade (corrected) after crystallization from ethyl acetate.

*Analysis:*
Percent calculated for $C_{19}H_{23}Cl_2NO_2$
                           C, 61.96; H, 6.29; N, 3.80
Found                 C, 61.96; H, 6.24; N, 3.95

*Example 5.—β-diethylamino-α-phenoxy-para-n-propoxypropiophenone and its hydrochloride*

Following the procedure of Example 1, using diethylamine, paraformaldehyde and para-n-propoxyacetophenone, β-diethylamino-α-phenoxy-para-n-propoxypropiophenone was prepared and converted, using an ethanolic solution of hydrogen chloride, to β-diethylamino-α-phenoxy-para-n-propoxypropiophenone hydrochloride which melted, after crystallization from ethyl acetate, at 89 to 91 degrees centigrade.

*Analysis:*
Percent calculated for $C_{22}H_{30}ClNO_3$ _____ Cl, 9.05
Found _____ Cl, 9.06

*Example 6.—β-dimethylamino-α-(para-n-propoxyphenoxy)-propiophenone and its hydrochloride*

Ten milliliters of a 37 percent aqueous solution of formaldehyde was added dropwise to a stirred solution of a slight molar excess of dimethylamine in 150 milliliters of 95 percent ethanol maintained at zero degrees centigrade. The resulting colorless solution was warmed to room temperature and 27 grams (0.10 mole) of α-(para-n-propoxyphenoxy)-acetophenone was then added thereto. The whole was refluxed for four hours whereafter 250 milliliters of water was added thereto and the whole extracted with ether. The ether layer was separated and washed with dilute hydrochloric acid. The aqueous acid extract was made basic with a dilute sodium hydroxide solution and thereafter extracted with ether. Upon evaporation of the ether, oily β-dimethylamino-α-(para-n-propoxyphenoxy)-propiophenone was obtained in 58 percent yield and was converted, with an ethanolic solution of hydrogen chloride, to β-dimethylamino-α-(para-n-propoxyphenoxy)-propiophenone hydrochloride. Addition of ether precipitated the oily hydrochloride which melted at 152.5 to 154 degrees centigrade on a Fisher-Johns melting block after crystallization from a one to two mixture of absolute ethanol and ether.

*Analysis:*
Percent calculated for $C_{20}H_{26}ClNO_3$
                           C, 66.01; H, 7.20; Cl, 9.74
Found                 C, 66.36; H, 7.19; Cl, 9.90

*Example 7.—β-dimethylamino-α-methyl-α-phenoxypropiophenone and its hydrochloride*

Following the procedure of Example 6 and refluxing for seventeen hours, β-dimethylamino-α-methyl-α-phenoxypropiophenone was prepared from dimethylamine, formaldehyde and α-phenoxypropiophenone. The thus-produced β-dimethylamino-α-methyl-α-phenoxypropiophenone was converted with an ethanolic solution of hydrogen chloride to β-dimethylamino-α-methyl-α-phenoxypropiophenone hydrochloride which melted at 188 to 189.5 degrees centigrade on a Fisher-Johns melting block after crystallization from a mixture of equal parts of absolute ethanol and ether.

*Analysis:*
Percent calculated for $C_{18}H_{22}ClNO_2$
                           C, 67.59; H, 6.94; Cl, 11.09
Found                 C, 67.75; H, 6.87; Cl, 11.06

*Example 8.—β-diethylamino-α-(ortho-methoxyphenoxy)-propiophenone and its hydrochloride*

Following the procedure of Example 6, β-diethylamino-α-(orthomethoxyphenyl)-propiophenone was prepared from diethylamine, formaldehyde and α-(ortho-methoxyphenoxy)-acetophenone. The thus-produced β-diethylamino-α-(ortho-methoxyphenoxy)-propiophenone was converted, using an ethanolic solution of hydrogen chloride, to β-diethylamino-α-(ortho-methoxyphenoxy)-propiophenone hydrochloride which melted at 116 to 117.5 degrees centigrade after crystallization from a one to nine mixture of ethanol and ether.

*Analysis:*
Percent calculated for $C_{20}H_{26}ClNO_3$_____ Cl, 9.74
Found _____Cl, 9.56

*Example 9.—β-diethylamino-α-methyl-α-phenoxypropiophenone and its hydrochloride*

Following the procedure of Example 6, using diethylamine, formaldehyde, and α-phenoxypropiophenone, β-diethylamino-α-methyl-α-phenoxypropiophenone was prepared which was thereafter converted, using an ethanolic solution of hydrogen chloride, to β-diethylamino-α-methyl-α-phenoxypropiophenone hydrochloride which melted at 134.5 to 135.5 degrees centigrade after crystallization from a one to five mixture of isopropyl alcohol and ether.

*Analysis:*
Percent calculated for $C_{20}H_{26}ClNO_2$_____ Cl, 10.19
Found _____ Cl, 10.07

*Example 10.—β-dimethylamino-α-phenyl-α-phenoxypropiophenone and its hydrochloride*

Following the procedure of Example 6, using diethylamine, formaldehyde and α-phenyl-α-phenoxyacetophenone, β-dimethylamino-α-phenyl-α-phenoxypropiophenone was prepared which was thereafter converted, using an ethanolic solution of hydrogen chloride, to β-dimethylamino-α-phenyl-α-phenoxypropiophenone hydrochloride which melted at 150 to 152 degrees centigrade after crystallization from a one to six mixture of ethanol and ether.

*Analysis:*

Percent calculated for $C_{28}H_{34}ClNO_2$ ---- Cl, 9.28
Found ---------------------------- Cl, 9.11, 9.14

*Example 11.*—$\beta$ - *dimethylamino* - $\alpha$ - *methyl-$\alpha$-phenoxy-3,4-dibenzyloxy-propiophenone and its hydrochloride*

Following the procedure of Example 6, using dimethylamine, formaldehyde and 3,4-dibenzyloxypropiophenone, $\beta$-dimethylamino-$\alpha$-methyl-$\alpha$ - phenoxy-3,4-dibenzyloxypropiophenone was prepared and converted, using an ethanolic solution of hydrogen chloride, to $\beta$-dimethylamino - $\alpha$ - methyl - $\alpha$ - phenoxy - 3,4 - dibenzyloxypropiophenone hydrochloride, which melted at 172 to 173 degrees centigrade after crystallization from a one to two mixture of ethanol and ether.

In a manner essentially that set forth in Examples 1 through 11, other $\beta$-tertiaryamino-$\alpha$-aryloxyalkyl aryl ketones are prepared by reacting the selected secondary amine, formaldehyde or the polymeric forms of formaldehyde, and an $\alpha$-phenoxyacetophenone or other $\alpha$-aryloxyalkyl aryl ketones. Compounds thus-prepared include: $\beta$-N-(methyl)isopropylamino-$\alpha$-ethyl-$\alpha$-(ortho-cresyloxy)-propiophenone from formaldehyde, N-(methyl)isopropylamine, and $\alpha$-ethyl-$\alpha$ - (ortho - cresyloxy) - acetophenone; $\beta$ - di-n - propylamino - $\alpha$ - n - propyl - $\alpha$ - phenoxypropiophenone from formaldehyde, di-n-propylamine, and $\alpha$-phenoxy-$\alpha$-n-propylacetophenone; $\beta$ - N - (methyl)isooctylamino - $\alpha$ - isobutyl - $\alpha$-(para - n - hexylphenoxy) - propiophenone from formaldehyde, N-(methyl)isooctylamine, and $\alpha$-isobutyl - $\alpha$ - (para - n - hexylphenoxy) - acetophenone; $\beta$ - di - n - octylamino - $\alpha$ - n - hexyl-$\alpha$ - (ortho - methoxyphenoxy) - ortho - methoxypropiophenone from formaldehyde, di-n-octylamine, and $\alpha$-n-hexyl-$\alpha$-(ortho-methoxyphenoxy) - ortho - methoxyacetophenone; $\beta$-pyrrolidyl - $\alpha$ - isooctyl - $\alpha$ - (ortho - n - propoxyphenoxy) - meta' - ethoxypropiophenone from formaldehyde, pyrrolidine, and $\alpha$ - isooctyl - $\alpha$-(ortho - n - propoxy - phenoxy) - meta' - ethoxyacetophenone; $\beta$ - 2 - methylpyrrolidyl - $\alpha$-cyclohexyl - $\alpha$ - (ortho - chlorophenoxy) - para'-chloropropiophenone from formaldehyde, 2-methylpyrrolidine, and $\alpha$-cyclohexyl-$\alpha$-(ortho-chlorophenoxy) - para' - chloroacetophenone; $\beta$-piperidyl - $\alpha$ - cyclopentyl - $\alpha$ - (meta-chlorophenoxy) - ortho' - bromopropiophenone from formaldehyde, piperidine, and $\alpha$-cyclopentyl-$\alpha$-(meta - chlorophenoxy) - ortho' - bromoacetophenone; $\beta$ - 2 - methylpiperidyl - $\alpha$ - (meta-iodophenoxy) - meta' - bromopropiophenone from formaldehyde, 2-methylpiperidine, and $\alpha$-(meta - iodophenoxy) - meta' - bromoacetophenone; $\beta$ - morpholino - $\alpha$ - (meta - bromophenoxy-para'-iodopropiophenone from formaldehyde, morpholine, and $\alpha$-(meta-bromophenoxy) - para' - iodoacetophenone; $\beta$ - N - (methyl)cyclohexylamino - $\alpha$ - (para - benzyloxyphenoxy) - ortho' - methoxypropiophenone from formaldehyde, N-(methyl)cyclohexylamine, and $\alpha$ - (para - benzyloxyphenoxy) - ortho' - methoxyacetophenone; $\beta$ - N - (methyl)benzylamino-$\alpha$ - (para - phenoxyphenoxy) - meta' - benzyloxypropiophenone from formaldehyde, N-(methyl)benzylamine, and $\alpha$-(para-phenoxyphenoxy)-meta' - benzyloxyacetophenone; $\beta$ - dibenzylamino - $\alpha$ - (para - hydroxyphenoxy) - para'-phenoxypropiophenone from formaldehyde, dibenzylamine, and $\alpha$ - (para - hydroxyphenoxy)-para'-phenoxyacetophenone, and the like.

The acid addition salts of these and other $\beta$-tertiaryamino-$\alpha$-aryloxyalkyl aryl ketones are prepared by reacting the selected $\beta$-tertiaryamino - $\alpha$ - aryloxyalkyl ketone with about a stoichiometric amount of an acid such as, for example, hydrochloric, acetic, sulfuric, citric, nitric, tartaric, phosphoric, lactic, succinic, or the like, in a solvent such as, for example, methanol, ethanol, benzene, toluene, chloroform, methylene chloride, pentane, mixtures of these, and others.

The quaternary ammonium salts of these and other $\beta$-tertiary-amino-$\alpha$-aryloxyalkyl aryl ketones are prepared by reacting the selected $\beta$-tertiaryamino-$\alpha$-aryloxyalkyl aryl ketone with an alkyl halide such as, for example, methyl chloride, ethyl chloride, propyl chloride, hexyl chloride, benzyl chloride, methyl bromide, ethyl bromide, isopropyl bromide, octyl bromide, methyl iodide, ethyl iodide, or the like. The reaction can be run in the absence of a solvent, or in the presence of a solvent such as, for example, ether, benzene, ethyl acetate, ethanol, or the like, at a temperature between about zero degrees centigrade and the boiling point of the reaction mixture. Optimum yields are usually obtained when the reaction is run at a temperature between about room temperature and the boiling point of the reaction mixture for between about a few hours and about 48 hours.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A compound selected from the group consisting of (1) amine bases represented by the formula:

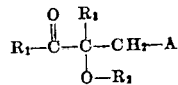

wherein $R_1$ and $R_2$ are aryl radicals selected from the group consisting of phenyl, lower-alkylphenyl, lower-alkoxyphenyl, benzyloxyphenyl, halophenyl and hydroxyphenyl radicals; wherein $R_3$ is selected from the group consisting of hydrogen and hydrocarbon radicals containing from one to eight carbon atoms, inclusive; and wherein A is a tertiary amine radical whose valence belongs to the amine nitrogen and which is selected from the group consisting of di-lower-alkylamine, N-(lower-alkyl)benzylamine, dibenzylamine, pyrrolidine, piperidine and morpholine radicals; (2) acid addition salts thereof; and (3) quaternary ammonium salts thereof.

2. An acid addition salt of $\beta$-di-lower-alkyl-amino-$\alpha$-phenoxypropiophenone.

3. An acid addition salt of $\beta$-di-lower-alkyl-amino-$\alpha$-lower-alkyl-$\alpha$-phenoxypropiophenone.

4. An acid addition salt of $\beta$-di-lower-alkyl-amino-$\alpha$-(lower-alkoxyphenoxy)propiophenone.

5. An acid addition salt of $\beta$-di-lower-alkyl-amino-$\alpha$-phenoxypropio-(lower - alkoxy) - phenone.

6. $\beta$-Dimethylamino - $\alpha$ - phenoxypropiophenone hydrochloride.

7. $\beta$-Dimethylamino-$\alpha$-methyl - $\alpha$ - phenoxypropiophenone hydrochloride.

8. $\beta$-Diethylamino-$\alpha$-methyl - $\alpha$ - phenoxypropiophenone hydrochloride.

9. $\beta$-Dimethylamino-$\alpha$-(para - n - propoxyphenoxy)-propiophenone hydrochloride.

10. β-Diethylamino-α-phenoxypropio-(para-n-propoxy)-phenone hydrochloride.

11. A process for the production of a β-tertiaryamino-α-aryloxyalkyl aryl ketone which comprises: reacting a secondary amine, formaldehyde, and an α-aryloxyalkyl aryl ketone to produce a β-tertiaryamino-α-aryloxyalkyl aryl ketone.

12. A process for the production of a β-tertiaryamino-α-phenoxypropiophenone which comprises: reacting a secondary amine, formaldehyde, and an α-phenoxyacetophenone to produce a β-tertiaryamino-α-phenoxypropiophenone.

13. A process for the production of a β-dialkylamino-α-alkyl-α-phenoxypropiophenone which comprises: reacting a dialkylamine, formaldehyde, and an α-alkyl-α-phenoxyacetophenone to produce a β-dialkylamino-α-alkyl-α-phenoxypropiophenone.

14. A process for the production of a β-dialkylamino-α-phenoxypropiophenone which comprises: reacting a dialkylamine, formaldehyde, and an α-phenoxyacetophenone to produce a β-dialkylamino-α-phenoxypropiophenone.

JOHN B. WRIGHT.
EDWARD H. LINCOLN.

References Cited in the file of this patent

Denton et al., J. A. C. S. vol. 71, pp. 2048–2050 (1949).